Aug. 26, 1969 R. A. CLAY 3,463,551

LIQUID WHEEL BALANCING SYSTEM

Filed June 19, 1967 2 Sheets-Sheet 1

ROBERT A. CLAY
INVENTOR

Huebner & Worrel
ATTORNEYS

Aug. 26, 1969 R. A. CLAY 3,463,551
LIQUID WHEEL BALANCING SYSTEM
Filed June 19, 1967 2 Sheets-Sheet 2

ROBERT A. CLAY
INVENTOR

Huebner & Worrel
ATTORNEYS

United States Patent Office 3,463,551
Patented Aug. 26, 1969

3,463,551
LIQUID WHEEL BALANCING SYSTEM
Robert A. Clay, Phoenix, Ariz., assignor to Sunland Refining Corporation, Fresno, Calif.
Continuation-in-part of application Ser. No. 593,399, Nov. 10, 1966. This application June 19, 1967, Ser. No. 647,115
Int. Cl. B60b *1/00, 27/00;* B60c *1/00*
U.S. Cl. 301—5                                          14 Claims

ABSTRACT OF THE DISCLOSURE

A balancing method and composite material for vehicle wheels having tires thereon which utilize a non-hardening liquid conveyor containing a flowable, particulate non-liquid weighting material adapted for deposit in such a tire so that upon wheel rotation the composite material is conveyed to the light side of the wheel and tire, centrifuged from the liquid conveyor, and at least temporarily suspended against the interior of the tire at the light side thereof to balance the tire and wheel with the liquid conveyor thereafter constituting a feathering or vernier balancing material responsive to minor imbalances while the weighting material remains in place. If the wheel and tire subsequently become unbalanced, the weighting material with the aid of the liquid conveyor repositions itself to re-establish a balanced condition.

Cross-reference to related applications

This is a continuation-in-part of my copending application Ser. No. 593,399, entitled "Automatic Wheel Balancing System," filed Nov. 10, 1966, and now abandoned in favor of this application.

Statement of the invention

The weighting material, due to its consistency, and the utilization of a liquid carrying vehicle, can adjust itself to correct imbalances which may occur or exist in a tire and its wheel. This is a continuing process and, over a relatively short period of time creates a substantially complete balance within a tire, whereby extraneous weights, such as are presently utilized, are not necessary, the exact principle of operation of this material is not completely understood, although it is believed to be a combination of centrifugal and centripetal forces which, under conditions of an imbalance of a tire and wheel, tend to throw the weighting material and/or the heavier weight of the material to the lighter side of the tire and wheel. The present material and its operation have been found in actual test usages to obviate previously presented unbalanced difficulties.

Heretofore methods and materials have been utilized in attempts to overcome and balance the weight of tire and wheel combinations, but primarily these have consisted in use of material in the nature of free moving globular material, such as buckshot or the like, or a free flowing liquid, such as mercury, and each time the wheel has stopped the material has settled to the bottom of the tire after which it has been necessary to recreate a balanced condition upon initiation of the rotation of the tire. One example of such material is shown in a patent to J. C. Wilborn, Patent No. 2,909,389, which incorporates a plurality of globular materials in the nature of buckshot.

One of the primary difficulties in the utilization of such material is that each time rotation of the tire is stopped, settlement of the weights occurs and it has been found that the material tends to cause interior tire wear which has created difficulties in addition to exterior tire wear.

The present invention employs a system of materials, including a non-hardening carrying liquid, which is insertable into the interior of a tire, and which contains a weighting material of certain characteristics which, in combination, not only tend to preserve the interior of the tire but also act during tire rotation to distribute weighted particles or material on to that portion of the tire which is lighter in weight, as compared with a heavier unbalanced portion of a tire or tire and wheel combination.

In contrast with the automatic wheel balancer of the designated Wilborn patent, the present invention utilizes a combination of materials, including a liquid conveyor, wherein the heavier particles used as the weighing materials are carried and from which they are deposited by centrifugation upon wheel rotation in a substantially fixed position interiorly of the tire, with the liquid conveyor subsequently serving as a feathering material, to effect a tire and wheel balance. Under operating conditions of a vehicle, if a new imbalanced condition occurs, the weighting material gradually moves to a new position to again balance the weel and tire aided by means of the liquid conveyor. However, when rotation of the wheel is stopped, the weighting material remains in position so that when rotation is resumed, the tire and wheel are still in balance.

It will therefore be apparent that the present invention resolves the problem of the balancing of wheels of vehicles, including motor vehicle wheels and the like, is particularly directed to wheels intended to be self-balancing, and tends to maintain the balancing material in an appropriate balancing position within the interior of a tire regardless of the position in which the wheel or tire stops. Among the objects of the invention is the provision of means to automatically and accurately correct imbalance in wheels in traveling vehicles, so as to reduce vibration and lessen wear in shock absorbers, steering mechanisms and other parts of the vehicle, while at the same time providing means for so balancing wheels of vehicles that the wheels will remain substantially continuously in balance regardless of the position thereof, such as for example, when the vehicle is brought to a stopped position.

Other objects are to provide a system and method whereby imbalance of the wheels is corrected substantially continuously, as the wheels are traveling, and which corrects new imbalances which occur due to operation of the vehicle. The carrying liquid material aids continuously to trim the balance of the tire for fine and accurate precise balance during rotation.

Another object is to provide such a material which is deposited within the interior of a tire, whether it be of a tubeless or tube type, through the valve stem thereof. During subsequent rotation, the material automatically so distributes and aligns itself within the interior of the tire cavity as to provide continuous balancing during operation, and subsequently retains its pre-established balancing position even when rotation is stopped.

The materials used for balancing of the tire, particularly the liquid conveyor, additionally serve to preserve the interior surface of the tire in an effective manner, and present no difficulties as regards tire wear or deterioration of the tire material. It has also been found, in actual use, that the liquid carrier acts to accomplish a feathering effect, and yet is free to move within the tire, upon circulation thereof to provide fine or precise balancing.

The liquid conveyor also acts as a lubricant to reduce the coefficient of friction involved. No deleterious effects have been found in use of the material.

Further objects and advantages of the present invention will be more readily apparent from the subsequent description of the drawings, in which:

FIG. 1 is a radial sectional view of a tire and a portion of its wheel showing injection of the balancing material from a can thereof in accordance with the teachings of the present invention;

FIG. 2 is a similar sectional view through a tire in which the balancing material has been placed, showing a differentiation between the heavier weight balancing material, and the liquid conveyor and flotational material therefor, which, after separation of the heavier weight material for balancing purposes serves as a feathering material and which normally is thrown by centrifugal action toward and around the inner periphery of the tire;

Figure 3:
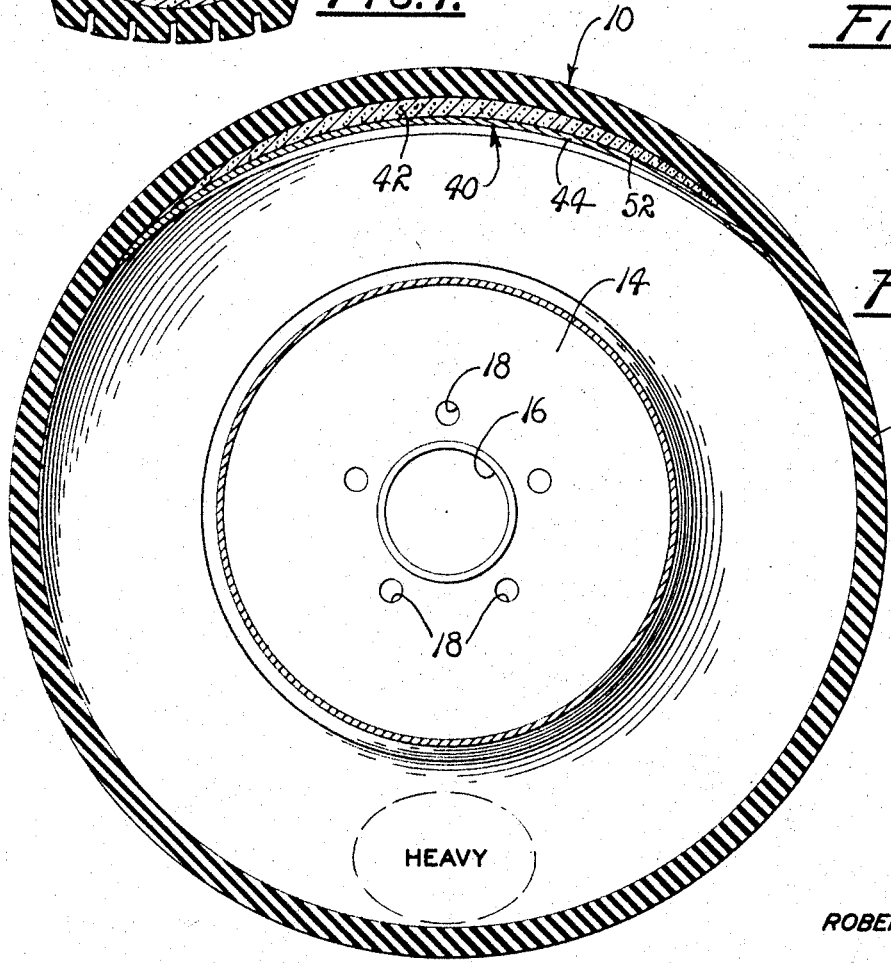
FIG. 3 is a schematic planar sectional view of a tire, and balancing material contained, therein similar to that shown in FIG. 2 of the drawings.

Referring in greater detail to the drawings, a vehicle wheel is generally designated at 10 in FIG. 3 having a usual tire 12 mounted thereon. The vehicle wheel comprises a usual hub portion 14 having a central opening 16 therein and a plurality of spaced lug openings 18 adapted for securement to the usual wheel mounting, not shown. The wheel shown in the drawings has a drop center rim adapted for the mounting of a tubeless type tire thereon. As is usual in this type of wheel construction, there are depending external wheel engagement portions 20 adapted firmly to engage the bead portions 22 which are normal in a tire construction of a tubeless type. It is to be understood however that the present invention is equally applicable to use of tires which have tubes mounted therein.

Figure 1:
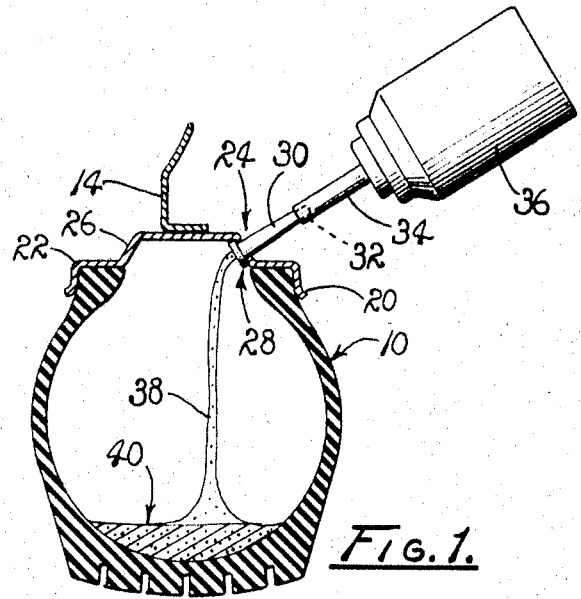

A pressure sealing valve stem 24 is inserted through the rim 26 of the wheel and in a normal manner opens inwardly as at 28 into the interior of the tire with an extended portion 30 which projects exteriorly of the wheel. This extended portion 30 is of course adapted to act in the same nature as existing valve stems. A screw-threaded portion 32 is provided on the stem extended portion 30, to accommodate a usual closure member, not shown, but in connection with the present invention is adapted for deposition thereon of the dispensing end 34 of a can or container of the equalizing or balancing material to be inserted within the tire. In use, the container can or nozzle designated as a dispensing end is affixed to and over the screw-threaded portion 32 and the can or dispensing member 36 per se includes an actuating valve, not shown, which upon actuation is adapted to release material from the can or container 36 into the interior of the tire. A force for propelling the material from the can or container 36, such as "Freon," is contained therein which, after vigorous shaking of the can and actuating the valve, forces the material from the can through the dispensing end 34 thereof. If desired, however, any type of gas or air under pressure may be utilized for the same purpose. The steam of material, designated at 38, is dispelled from the container 36 through the dispensing end 34 of the container, and through the valve stem 24 into the interior of the container. In FIG. 1 of the drawings, it will be seen that this material is initially deposited in a layer 40 at the lowermost point of the interior of the tire, to be subsequently dispersed upon rotation of the tire.

Figure 2:
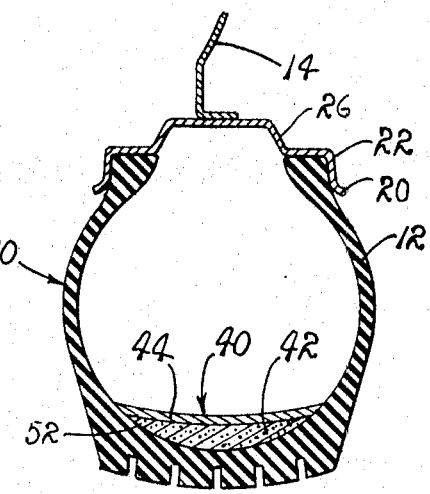
Figure 4:
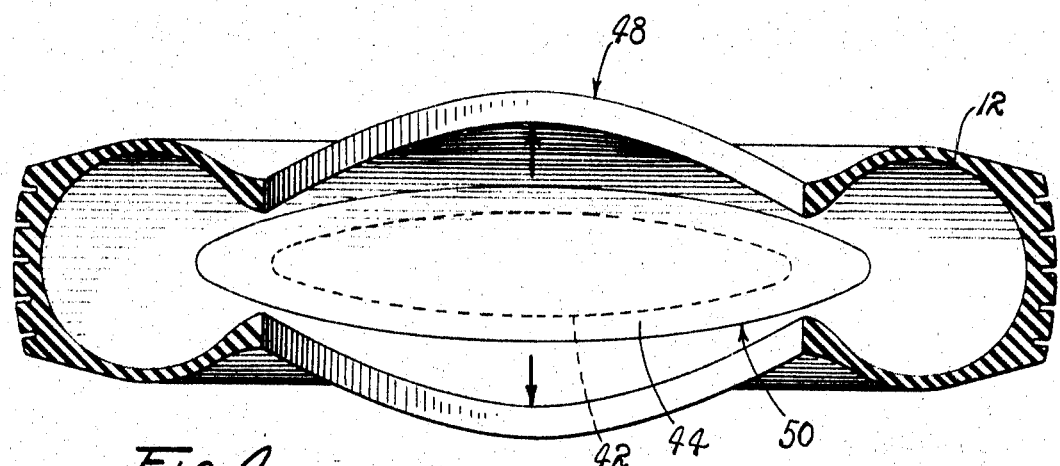
FIG. 4 is an enlarged diametric sectional view of a tire having its beads distended showing the interior of a tire cavity with the balancing material of the present invention disposed therein.

In FIGS. 2, 3 and 4 of the drawings is depicted the results of deposition of the material upon subsequent rotation of the wheel at a sufficient speed to separate the various components thereof. The composite material contained in the can includes at least three components, including a heavy weighting material adapted to be deposited against the lighter side of a tire and wheel combination, such as a weighting particulate material 42. The composite material also includes a positional retaining material which can consist of various constituents to which reference will be made. Additionally, the composite material contains a fluid conveyor, such as generally indicated at 44. This latter material serves as a liquid insertion and conveying agent for the heavier material, as explained above. Additionally and preferably, the liquid conveying material consists of a material which will enhance and improve the material of the interior of which the tire is composed, and also acts as a balancing feathering agent.

Referring to FIGS. 2 and 3 it has been found that, under normal operating conditions of a vehicle, speeds in excess of approximately twenty-five miles per hour generate adequate centrifugal forces to displace or dispel the material 42 of a heavier nature from the overall consistency of the composite material placed within the tire, and due to prelubrication or wetting of the interior of the tire, to adhere the heavier material 42 and the retaining material against the interior surface of the tire, at least temporarily, to counterbalance any imbalance existing in the tire and/or in the wheel and tire combination. As is well known in the art, wheel and tire combinations many times are out of balance due to imperfections in the manufacture of the tire per se, which can and many times do include areas which are heavier than others. An imbalance in a wheel and tire combination can also be imposed by virtue of the weight and positioning of the valve stem 24.

A normal correction method for such imbalances usually includes the external placement of weights, including materials such as lead, which are affixed to the exterior of the wheel rim, and many methods have been devised to ascertain where such weights should be placed. In practice, however, such external disposition of weights tends to create a further subsequent imbalance in a tire resulting in greater wear due to centrifugal forces caused by the location of the weights on the wheel. The present invention overcomes these difficulties, as well as the problems caused by placement of wheel weights on only one axial side of a wheel, which results in an axial displacement of balance from the desired plane which extends symmetrically through the tire and wheel normal to the axle.

FIG. 4 of the drawings schematically discloses disposition of the balancing material within a tire. This view shows the beads of the tire distended at 48, as for an examination of the interior of a tire in which the present material has been used. The tire 12 is of a usual construction. The tire 12, however, is assumed to have a light area, which causes difficulties in balancing a combination tire and wheel combination. The present material, including the heavier weighting material and its positional retaining material, heretofore generally designated at 42, tends to flow into, and cover the light area of the tire, on the far side as the tire is viewed. This material, as hereinbefore set forth, is conveyed by the liquid conveying material 44 which tends to flow externally of the weighted material and to be positioned thereover incident to centrifugation to provide a balancing feathering condition. The material of the present invention generally tends to assume an oblate configuration, as indicated at 50 in FIG. 4, primarily due to a breaking out of the heavier material from the suspending material and subsequent deposition of the heavier material in the light cavity. The oblate configuration varies and normally is not symmetrical within the tire cavity, depending upon side or radial imbalances within the wheel.

Figure 6:
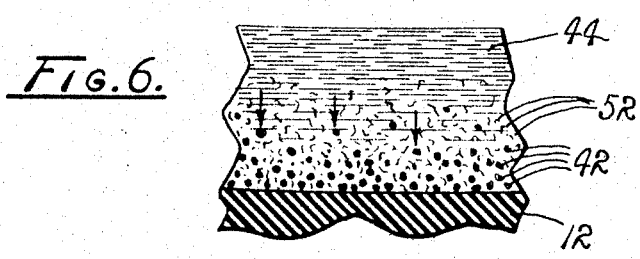
FIG. 6 is an enlarged fragmentary sectional view through a tire utilizing the present invention and including a showing of the counterbalancing materials as deposited therein upon rotation of the tire.

FIG. 6 pictorially discloses the position of the materials which results during operation of deposition of balancing material in the tire. Here a portion of the tire 12 is shown with the weighting material 42, its sustaining medium conveyor 44 and its positional retaining material 52. With a balancing material of the present invention deposited in the interior of a tire and upon rotation of a tire there is a centrifugal directional force applied to the weighted particulate material, as indicated by arrows in FIG. 6. This force tends to move the particulate heavier material outwardly to the lighter side of the tire where it is deposited to create a balanced condition.

Figure 5:
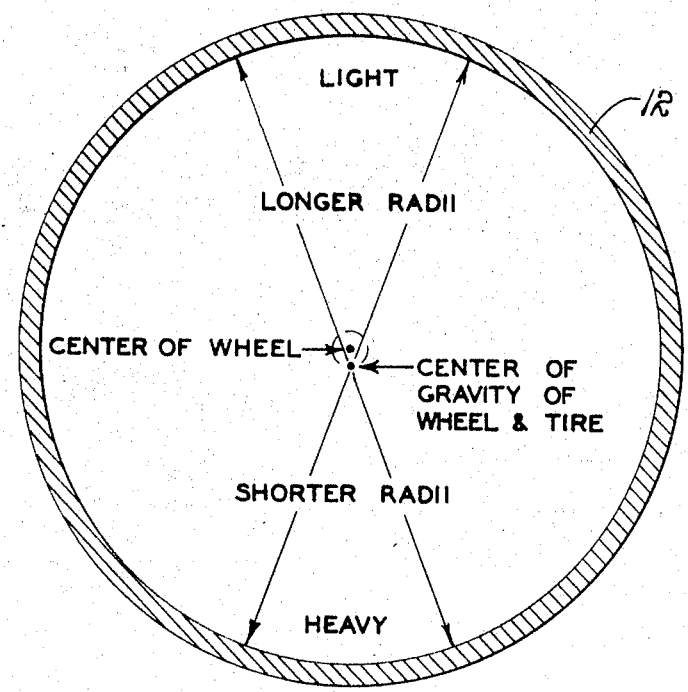
FIG. 5 is a diagram illustrating the operation of the invention to balance the tire.

This phenomenon is best illustrated by reference to FIG. 5. In a rotating body of unequal or eccentric weight distribution, the center of gravity is closer to the heavy portion of the rotating body than it is to its lighter portion. When rotated, the body tends to rotate about its center of gravity, as designated by the term "center of gravity of wheel and tire" rather than about the dimensional "center of the wheel." Similarly, when an unbalanced wheel and tire are rotated, their center of gravity and center of rotation are closer to the heavy portion of the tire than to the lighter portion. This results in longer radii from the center of gravity of the rotated unit to the lighter portions of the tire than to the heavier portions due to the weight differentials. Utilization of fluid counterbalancing material of the present invention overcomes or compensates for this differential in radii and unbalanced condition, and causes the balancing material inserted within the tire to flow to the area of the longer radii, or the lighter portion, thus tending to balance the tire and wheel combination. Centrifugal force tends to throw a material within an enclosure to the outer extremity thereof. In the present circumstance, wherein the tire and wheel do not rotate about the center of the wheel as shown in FIG. 5, the entire entity tends to rotate about the indicated center of gravity of the tire and wheel. This in a significant degree is permitted by modern suspension systems and tire resilience.

When this occurs the composite material; consisting of a weighting particulate material, a positional retaining material and a liquid conveying material; acts in a manner such as to deposit the materials as schematically shown in FIG. 6. The heavy particles are thrown to the outside of the tire, in combination with the positional retaining material therefor, and the liquid conveying material remains substantially within the peripheral confines of these areas, and acts as a liquid balancing feathering composition.

Many materials can be used to effect the desired results of the present invention. Broadly, the weighting particulate material can consist of galena, which is ground lead, barite, ground marble, bentonite or the like. It must be flowable in the sense that it can be poured and it must be relatively heavy to accomplish its balancing effect as well as to be subject to substantial separation from the conveyor fluid by centrifugation. Particulate solids characterized by those designated are preferred.

The fluid flotation and positional retaining material preferably has a relatively high viscosity having the capacity of suspending the weighting materials, and can consist of a suspension agent which, upon contact with the fluid in the can, or in the mixing of the material, is expandable to form a viscous gel. Many suitable materials have been found which are usable in this connection. As one example, a finely ground asbestos used basically in low solid mud systems, which can be purchased under the trade name "Flo-Sal," can be used. Aqua gels and earth gels of an expansion type material can likewise be used for this purpose. It has also been found that calcites, attipulgate clay, gypsum materials, bentonite, macaloid and hectorites are usable. The main function of this flotation or retaining material for the heavy particulate material is to retain the weighting particulate material in the desired area of the lighter side of the tire and tend to prevent its displacement therefrom.

Due to the use of the liquid conveying material, however, when a further imbalance in the tire and/or tire-wheel combination occurs there can be a gradual movement of the particulate material, due to its suspension and the liquid conveying material, into a new position to again correct any substantial amount or degree of imbalance of the tire. This action occurs by a creeping of the heavier particulate material and its suspension material around the interior of the tire.

In order to facilitate usage of the material which creates the main balance of the tire, the interior of the tire is preconditioned, and a wettened surface afforded, within which the weighted particulate material and its fluid flotation or retaining material will orient itself. This achieved by the fluid conveyor 44 which can consist of many known materials but preferably a material such as glycerol, commonly heretofore known under the term of "glycerine." Other suitable fluid conveyors are ethylene glycol, monoethanolamine, dimonoethanolamine, trimonoethanolamine, ethylene glycol n-butyl ether, diethylene glycol ethyl ether, bisphenol A, sodium borate, the polyglycols, and substances having similar characteristics.

The present invention is useful in automobile tires, truck tires, airplane tires, motorcycle tires, and practically all pneumatic or inflated vehicle tires. Under some circumstances it is desirable to adjust the proportions of materials to accommodate various anticipated weights and forces and to include distinctive dye material so as to be able to readily differentiate between materials susceptible of different uses.

In operation, the centrifugal force, acting as a centrifuge on the heavier material tends to dispel or throw the heavier material out of its flotational or retaining carrier. This causes the heavier materials to be forced and held against the inside wall of the tire, where it becomes positionally semi-permanent, and thereby remains in a balancing position with respect to the tire. The liquid conveyor however tends to remain radially inwardly of the tire over the other materials, and serves as a vernier trimming or balancing material to compensate for minor conditions of imbalance.

Example

Glycerine _____gallons__ 500
Bentonite or barite _____pounds__ 300
Flo-Sal _____do____ 7
Dye added for desired color.
Propellant used in cans—Freon.

To mix: Circulate the glycerine with a centrifugal pump, drawing from bottom of a vat, and returning to top of vat. Add 300 pounds of bentonite, circulate two hours for desired temperature and mix. Add 7 pounds of Flo-Sal, circulate thoroughly, approximately two hours.

As set forth, other weighting materials, other positional retaining materials and other fluid conveyors can be utilized so long as the weighting material is of sufficient specific gravity substantially to centrifuge from the retaining materials and fluid conveyors during tire rotation and so long as the retaining materials and fluid conveyors constitute a non-hardening holding medium for the weighting material adapted to hold the latter in position against a tire wall when substantially centrifuged from the composite material but to facilitate repositioning thereof upon subsequent imbalance of the tire.

In the above described compound, Flo-Sal, which constitutes a trade name, is a finely ground asbestos, used basically in low solid mud systems. The gels consist preferably of soft gels such as attipulgite clay used for building viscosity in salt, or brackish water muds. Other and similar materials, as will be readily apparent to those skilled in the art, can be used to constitute the fluid flotation or retaining fluid material, so long as they have the high viscosity factor and which are preferably expandable upon fluid contact.

Typical physical and chemical properties of the described bentonite are:

X-ray analysis

| | Percent |
|---|---|
| Montmorillonite | 85 |
| Quartz | 5 |
| Feldspars | 5 |
| Cristobalite | 2 |
| Illite | 2 |
| Calcite & Gypsum | 1 |

| Screen analysis | Coarse grind, percent | Fine grind percent |
|---|---|---|
| Thru 20 mesh | 99.9 | 100.0 |
| Thru 30 mesh | 92.0 | 99.9 |
| Thru 40 mesh | 75.0 | 92.0 |
| Thru 100 mesh | 22.0 | 23.0 |
| Thru 200 mesh | 4.0 | 3.5 |

Chemical analysis

| | Percent |
|---|---|
| $SiO_2$ | 55.44 |
| $Al_2O_3$ | 20.14 |
| $Fe_2O_3$ | 3.67 |
| CaO | .49 |
| MgO | 2.49 |
| $Na_2O$ | 2.76 |
| $K_2O$ | .60 |
| Bound Water | 5.50 |
| Moisture at 220° F. | 8.00 |
| Total | 99.09 |

Miscellaneous properties

| | |
|---|---|
| Specific gravity of dried material | 2.79 |
| Specific gravity of natural material | 2.00 |
| Fusion temperature ° F | 2,444 |
| Weight of dried bulk unpulverized lb. per cu. ft | 71 |
| Weight of pulverized material lb. per cu. ft | 61 |
| Weight of crude, crushed, undried material lb. per cu. ft | 80 |
| Refractive index | 1.557 |
| pH of 6% water suspension | 8.8 |

Manifestly, many variations in specific materials can be utilized which incorporate the same operational characteristics as mentioned before. It is intended that such materials be included within the teachings of the present invention.

It has been found in operation that when materials in accordance with the foregoing teachings of the invention have been inserted into a tire, they not only create a balance of the tire upon rotation thereof at relatively high speeds, but if the tire again becomes out of balance, the materials creep around the tire interior to obviate the imbalance. The liquid conveying material dissipates minor imbalance corrections.

Although the invention has been herein shown and described in what are conceived to be the most practical and preferred embodiments and the ingredients typified by the designation of numerous suitable materials, it is recognized that departures may be made therefrom within the scope of the invention, which is not to be limited to the details disclosed herein.

Having described my invention, what I claim as new and desire to secure by Letters Patent is:

1. A pneumatic wheel tire having therein a tire balancing material comprising a particulate flowable weighting material; and a viscous substantially non-hardening liquid positional retaining material having the weighting material suspended therein in discrete particulate form, the weighting material being of a higher specific gravity than the liquid positional retaining material for appreciable centrifugation therefrom incident to tire rotation and releasable rentention in position in the tire by said positional retaining material upon said centrifugation.

2. The combination of claim 1 in which the positional retaining material comprises a gel.

3. The combination of claim 1 in which the positional retaining material comprises a suspension agent which expands to form a gel when mixed with a liquid conveyor, and such a liquid conveyor of a specific gravity less than that of the suspension agent so that upon tire rotation the suspension agent is centrifuged from the retaining material to assist in retaining the weighting material in place.

4. The combination of claim 3 in which the liquid conveyor is selected from the group consisting of glycerol, ethylene glycol, monoethanolamine, dimonoethanolamine, trimonoethanolamine, ethylene glycol n-butyl ether, diethylene glycol ethyl ether, bisphenyl A, and polyglycols.

5. A pneumatic wheel tire having therein a tire balancing material comprising a particulate flowable weighting material; a viscous substantially non-hardening liquid positional retaining material releasably adherent to the interior of a tire having the weighting material suspended therein in discrete particulate form, the weighting material being of a higher specific gravity than the liquid positional retaining material for appreciable centrifugation therefrom incident to tire rotation and releasable retention in position in the tire by said positional retaining material upon said centrifugation; and a non-drying liquid conveyor for said weighting and positional retaining material.

6. The combination of claim 5 in which the weighting material, positional retaining material and the liquid conveyor are in substantially homogeneously mixed condition, in which the weighting material has the highest specific gravity, the retaining material has a somewhat lower specific gravity, and the conveyor has the lowest specific gravity for substantial centrifugal separation incident to tire rotation.

7. The combination of claim 5 in which the weighting material is a particulate solid of a higher specific gravity than the positional retaining material and the liquid conveyor.

8. The combination of claim 5 in which the positional retaining material is selected from the group of gels consisting of powdered asbestos, clay, bentonite, calcite, hectorite, and aqua gels and earth gels generally.

9. The combination of claim 5 in which the liquid conveyor is selected from the group consisting of glycerol, ethylene glycol, monoethanolamine, dimonoethanolamine, trimonoethanolamine, ethylene glycol n-butyl ether, diethylene glycol ethyl ether, bisphenyl A, and polyglycols.

10. A pneumatic wheel tire having therein a tire balancing material comprising a particulate flowable weighting material; a viscous substantially non-hardening positional retaining material selected from the group of gels consisting of powdered asbestos, clay, bentonite, calcite, hectorite, and aqua gels and earth gels generally having the weighting material suspended therein in discrete particle form, the weighting material being of a higher specific gravity than the liquid positional retaining material for appreciable centrifugation therefrom incident to tire rotation and releasable rentention in position in the tire by said positional retaining material upon said centrifugation; and a liquid conveyor selected from the group consisting of glycerol, ethylene glycol, monoethanolamine, dimonoethanolamine, trimonoethanolamine, ethylene glycol n-butyl ether, diethylene glycol ethyl ether, bisphenyl A, and polyglycols.

11. A method of balancing a vehicle tire comprising depositing in the interior of the tire a composite material including a particulate, flowable, weighting material; and a viscous, substantially non-hardening liquid, positional retaining material having the weighting material suspended therein, the weighting material being of a higher specific gravity than the positional retaining material; and rotating the tire at a rotational velocity sufficient to throw the composite material to an area of the tire of relatively lighter weight than the rest of the tire and appreciably to centrifuge the weighting material from the positional retaining material at that area, the positional retaining material being releasably adherent to the interior of the tire.

12. The method of claim 11 in which the positional retaining material is selected from the group of gels consisting of powdered asbestos, clay, bentonite, clacite, hectorite, and aqua gels and earth gels generally.

13. A method of balancing a vehicle tire comprising depositing in the interior of the tire a composite material including a flowable, weighting material; a positional retaining material releasably adherent to the interior of a tire having the weighting material suspended therein; and a non-drying liquid conveyor for said weighting and positional retaining material, the weighting material being of a specific gravity greater than the positional retaining material and the positional retaining material being of a specific gravity greater than the liquid conveyor; and rotating the tire at a rotational velocity sufficient to position the composite material at the lightest circumferential position of the tire and appreciably to centrifuge the weighting material from the positional retaining material and the positional retaining material from the conveyor releasably to retain the weighting material in place.

14. The method of claim 13 in which the positional retaining material is selected from the group consisting of powdered asbestos, clay, bentonite, calcite, hectorite, and aqua gels and earth gels generally in gel form, and the liquid conveyor is selected from the group consisting of glycerol, ethylene glycol, monoethanolamine, dimonoethanolamine, trimonoethanolamine, ethylene glycol n-butyl ether, diethylene glycol ethyl ether, bisphenyl A, and polyglycols.

References Cited

UNITED STATES PATENTS

| | | |
|---|---|---|
| 2,214,366 | 9/1940 | Freeland. |
| 2,217,926 | 10/1940 | Campen. |
| 2,836,083 | 5/1958 | Smith _____ 74—573 |
| 3,227,657 | 1/1966 | Haden _____ 252—317 |
| 1,209,730 | 12/1916 | Leblanc. |
| 2,193,734 | 3/1940 | MacCracken _____ 152—330 X |
| 2,695,047 | 11/1954 | Ruck. |
| 2,737,420 | 3/1956 | Wilborn. |
| 2,909,389 | 10/1959 | Wilborn. |
| 3,063,754 | 11/1962 | Pierce. |

RICHARD J. JOHNSON, Primary Examiner

U.S. Cl. X.R.

74—573; 152—330